April 21, 1931.  J. J. SUNDAY  1,801,579
ARTIFICIAL BAIT
Filed July 22, 1929  2 Sheets-Sheet 1
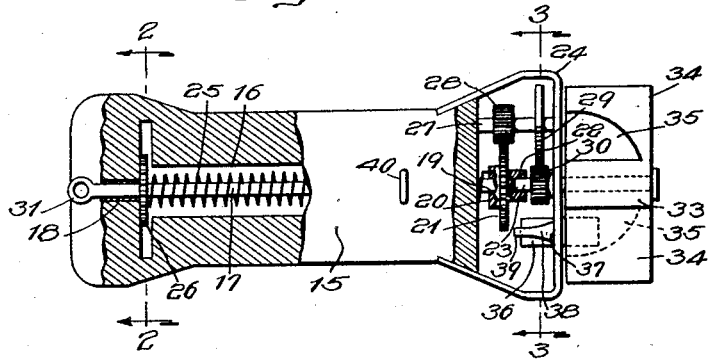
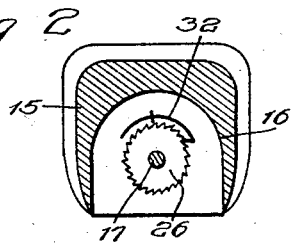
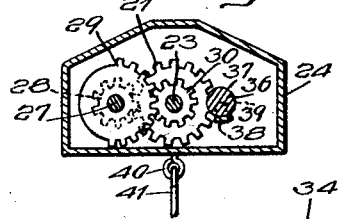
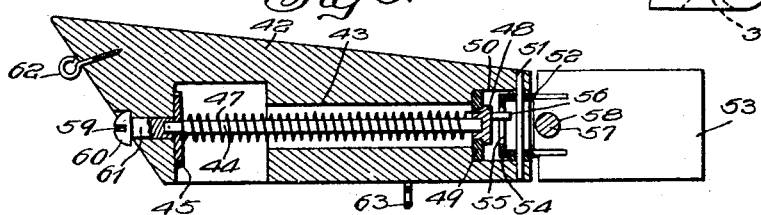
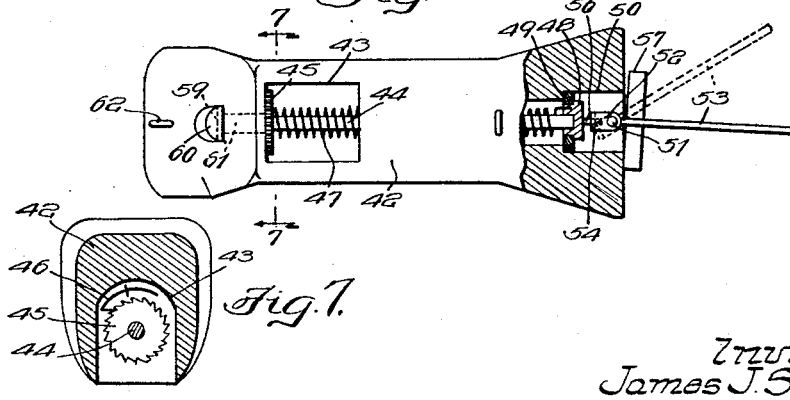
Witness
William P. Kilroy
Inventor
James J. Sunday
By Hill & Hill April 21, 1931.   J. J. SUNDAY   1,801,579
ARTIFICIAL BAIT
Filed July 22, 1929   2 Sheets-Sheet 2

Inventor
James J. Sunday
By Hill & Hill
Attys

Witness
William P. Kilroy

Patented Apr. 21, 1931

1,801,579

UNITED STATES PATENT OFFICE

JAMES J. SUNDAY, OF CHICAGO, ILLINOIS, ASSIGNOR OF ONE-HALF TO JOHN E. FOUTH AND EDWARD F. FOUTH, BOTH OF CHICAGO, ILLINOIS

ARTIFICIAL BAIT

Application filed July 22, 1929. Serial No. 380,090.

This invention relates to artificial baits or fish lures and particularly to that type of artificial bait wherein movable parts thereof are mechanically operated.

One object of the present invention is to provide a lure of the character described intended to simulate the movement or "flopping" of a small fish on the surface of the water.

Another object of the invention is to provide suitable driving means for the movable parts of the lure whereby such parts may be intermittently actuated.

Another object of the invention is to provide a suitable and compact source of power or energy for actuating the movable part of the lure and means for energizing such source of power.

A further object of the invention is to provide a suitable key or retaining member for securing the movable parts against operation during the casting of the lure, the material of the key member being such as to be responsive to the action of the water thereon in a manner to release and permit the operation of the movable parts of the lure at a predetermined time after the lure casting operation of the line is completed.

A still further object of the invention is to improve devices of the character disclosed in sundry details hereinafter described and particularly pointed out in the appended claims.

Embodiments of the present invention are shown for illustrative purposes in the accompanying drawing, in which Fig. 1 is a bottom plan view, partly in section, of an artificial bait or lure illustrating an embodiment of my invention applied thereto;

Fig. 2 is a sectional elevation taken as indicated by the line 2—2 of Fig. 1;

Fig. 3 is a sectional elevation taken substantially as indicated by the line 3—3 of Fig. 1;

Fig. 4 is a rear end view of a movable element of the lure illustrated in Fig. 1;

Fig. 5 is a longitudinal sectional elevation illustrating a more simplified form of structure to which features of the present invention may be applied;

Fig. 6 is a bottom plan view, partly in section, of the structure shown in Fig. 5;

Fig. 7 is a transverse sectional elevation taken as indicated by the line 7—7 of Fig. 6;

Figure 8:
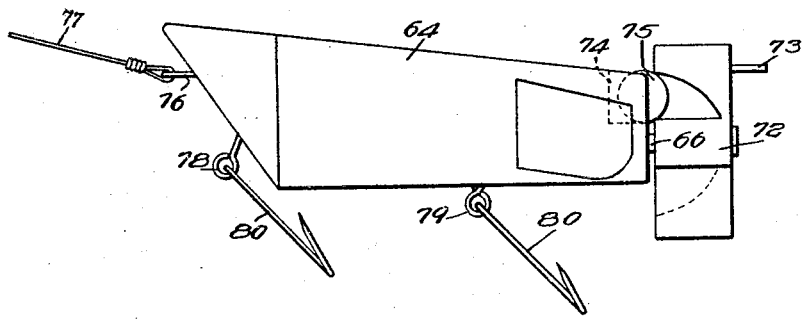
Fig. 8 illustrates another simplified form of structure to which the present invention may be applied.

Referring to the drawings and particularly to Figs. 1 to 4 thereof, the illustrative embodiment of the invention shown therein comprises a body portion 15 having a centrally disposed longitudinally extending chamber 16 formed therein and a shaft 17 positioned in said chamber and extending longitudinally thereof, the shaft being rotatably mounted in a suitable bearing 18 at the forward end of the body portion and having its rear end portion positioned in a socket 19 formed in the hub portion 20 of a gear member 21, the hub portion at the opposite side of the gear 21 being provided with a socket 22 adapted to receive one end of a stub or agitator shaft 23 mounted in suitable bearings carried by a gear housing 24 mounted at the rear end of the body portion 15.

Surrounding the shaft 17 is a spirally formed spring 25 having one of its end portions connected to a ratchet wheel 26 secured to the shaft 17 within the chamber 16 and, in the present instance, adjacent the forward end thereof, the rear end portion of the spring 25 being suitably connected to the hub portion 20 of the gear 21.

Mounted in suitable bearings formed in the body portion 15 and the housing 24 is a jack shaft 27 having a pinion 28 secured thereto and adapted to mesh with the teeth of the gear 21, the pinion 28 being of somewhat less diameter than the gear 21.

Secured also to the jack shaft 27 is a relatively large gear 29 adapted to mesh preferably with a relatively smaller pinion 30 secured to the stub or agitator shaft 23, a portion of the teeth on the gear 29 being mutilated or omitted in a manner to cause the remaining teeth on the gear 29 to drive the pinion 30 intermittently.

For winding the spring 25 around the shaft 17 for energizing the spring motor, the shaft 17 is provided, in the present instance, with an enlarged cross head or eye portion 31 which may be grasped in a manner to rotate the shaft and ratchet 26 attached thereto, a retaining pawl 32 mounted on the body member 15 being cooperable with the teeth of the ratchet 26 in a manner to prevent unwinding or backward movement of the shaft 17 during the winding operation. If desired, as in the present instance, the cross head or eye portion may serve as a means for connecting the lure to the line by which the lure is controlled.

Secured to the agitator shaft 23, in the present instance, at the extreme rear end of the lure is an agitator 33 having blade portions 34 formed thereon, each of said blade portions having a recess 35 formed in one of its flat sides and adapted to be engaged by a key member 36 formed, in the present instance, as of cylindrical form and adapted to be positioned in an aperture 37 formed in the rear end wall of the housing 24 and extending outwardly of the housing in a manner to be engaged by the said blades and prevent rotation of the agitator while the spring motor is being energized and during the casting operation of the lure.

For preventing canting of the key member 36 in the aperture 37 of the housing, a bracket 38 having a transversely extending portion 39 formed thereon may be provided, and may be secured to the housing 24 or formed from a portion thereof bent inwardly in a manner to serve as a stop for the inner end of the key member 36 when pressure is exerted on the outer end of the key member by the blades 34 of the agitator 33 when the spring motor is energized, the portion 39 serving to position the inner end of the key member within the housing.

The key member 36, in the present instance, is intended to be constructed of any suitable material or materials responsive to the action of water when brought in contact therewith as, for example, materials which will be dissolved or become softened by the water to the extent that they will no longer serve to prevent the rotation of the agitator 33 under the force of the spring motor.

One construction of the key member 36 which has been found desirable and very efficient for the purpose desired is a hardened composition consisting of approximately 75% common salt and approximately 25% baking soda, it being understood, however, that if found convenient and desirable, other suitable material or materials in suitable proportions may be employed. In the use of the ingredients above specified, it has been found that a period of approximately seven seconds will elapse after the lure has been brought into contact with the water before the key member becomes dissolved and sufficiently weakened to release the agitator, it being my intention to provide a key member of suitable substance which may be positioned on the body portion of the lure in a manner to prevent rotation of the agitator while the spring motor is being energized, during the casting operation and for a few seconds after the lure is at rest, on the surface of the water, the rotation of the agitator and the engagement of the blades with the water providing a very close and effective simulation of the "flopping" of a minnow on the water.

It will be observed from the foregoing description that in the operation of the device, the lure may be reeled in after a casting operation and a key member inserted in the aperture 37 after which the spring motor may be energized by the rotation of the shaft 17 and, when the spring 25 is sufficiently wound, the lure may be cast in a manner common to ordinary lures, and after the present lure has come to rest on the surface of the water a few seconds will elapse during the disintegration, dissolving or softening of the key member 36 sufficiently to release the agitator and permit it to rotate in the water under the force of the spring 25 transmitted through the reduction gearing contained in the housing 24, and by reason of the mutilated portion of the gear 29, an intermittent rotary movement will be imparted to the agitator thereby continuing the simulation of a "flopping" minnow over a period of time depending upon the energy stored in the spring motor.

It will be understood, of course, that the lure above described may be provided with suitably positioned screw eyes 40 for the purpose of attaching hooks 41 thereto.

In Figs. 5 and 6 is shown a more simplified form of structure to which features of the present invention may be applied and in which a different form of agitator is employed.

The structure disclosed in Figs. 5 and 6 comprises a body portion 42 having a centrally disposed longitudinally extending opening 43 formed therein, and a rotatable shaft 44 suitably mounted in bearings preferably at the forward and rear ends of the body portion 42. Secured preferably to the forward end of the shaft 44 is a ratchet 45 having a retaining pawl 46 associated therewith for preventing rotation of the shaft 44 in one direction, and surrounding the shaft 44 within the opening 43 is a spiral spring 47 having one of its end portions secured to the ratchet 45 and its opposite end portion secured to a disc 48 rotatably mounted in a bearing plate 49 positioned within a recess 50 formed in the rear end of the body portion 42.

Mounted also in the recess 50 on a vertically disposed pivot pin 51, in a manner to oscillate thereon, is a bracket 52, to the rear end portion of which is secured an oscillating agitator 53 extending outwardly from the rear end of the body member 42, the forward end portion of the bracket 52 extending forwardly of the pivot pin 51 and being provided in its upright portion 54 with a vertically disposed elongated slot 55 adapted to receive a crank pin 56 positioned eccentrically on the disc 48 with respect to the axial line of rotation of the disc.

Suitably formed in the agitator 53 preferably adjacent the forward edge thereof is an aperture 57 adapted to receive a key member 58 in a manner to extend a substantial distance on each side of the agitator for engagement with the rear end face of the body portion 42 for preventing oscillation of the agitator 53 during the energizing of the spring motor and casting operation. In the construction shown in Figs. 5 and 6, the spring may be wound by a suitable tool as, for example, a screw driver inserted in a slot 59 formed in a head 60 connected through its shank portion 61 with the end of the shaft 44.

The operation of the lure illustrated in Figs. 5 and 6 is similar to that described in connection with the structure shown in Figs. 1 to 3, inclusive, in that the motor is energized and the lure cast in the manner above described and after coming to rest on the surface of the water a few seconds will lapse during the dissolving or softening of the key member 58 sufficiently to release the agitator 53 and permit it to oscillate under the force of the spring motor by reason of its connection therewith through the engagement of the crank pin 56 with the elongated slot 55 formed in the vertically extending portion 54 of the bracket 52.

A suitably positioned screw eye 62 may be provided for attaching the line by which the lure is controlled and screw eyes such as 63 may be suitably positioned on the body portion for connecting hooks thereto.

Figs. 7 to 12, inclusive, illustrate another form of the structure to which the present invention may be applied and in the structure illustrated comprises a body portion 64 having a centrally disposed longitudinally extending opening or groove 65 formed therein and a shaft 66 extending longitudinally of the opening and rotatably mounted in bearings 67 and 68 positioned at the forward and rear ends of the opening, respectively.

Surrounding the shaft 66 within the opening 65 is a spiral spring 69 having one of its end portions connected to the body portion 64 as indicated at 70 and its opposite end portion secured to the shaft 66 as indicated at 71.

Secured to the rear end of the shaft 66 outside of the rear end portion of the body member 64 is an agitator 72 similar in construction to the agitator shown and described with reference to Fig. 1 and differing therefrom in that a crank or handle portion 73 is positioned on the rear edge portion of the agitator 72 for the purpose of rotating the shaft 66 in a manner to wind the spring 69 therearound.

Formed on the body member 64 adjacent the rear end portion thereof is a recess 74 adapted to receive a key member 75 shown, in the present instance, as having the form of a round relatively flat slug or tablet, the slug 75 being positioned in the recess 74 in a manner to extend beyond the rear end of the body member 64 and into the path of rotation of the agitator 72 for securing the agitator against rotation after the spring motor has been energized.

A screw eye 76 is provided for attachment to a line 77 by which the operation of the lure is controlled and it will be understood that screw eyes 78 and rings 79 may be suitably positioned on the body member 64 for attaching hooks 80 thereto.

Figure 9:
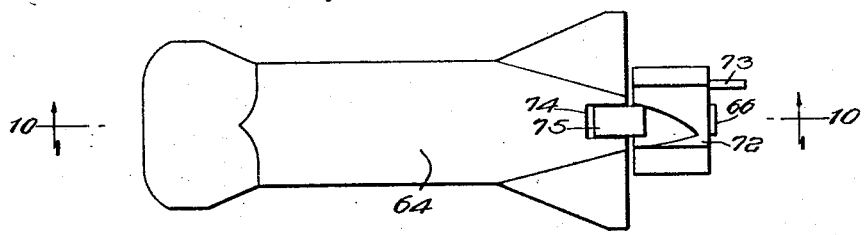
Fig. 9 is a plan view of the structure shown in Fig. 8.
Figure 10:
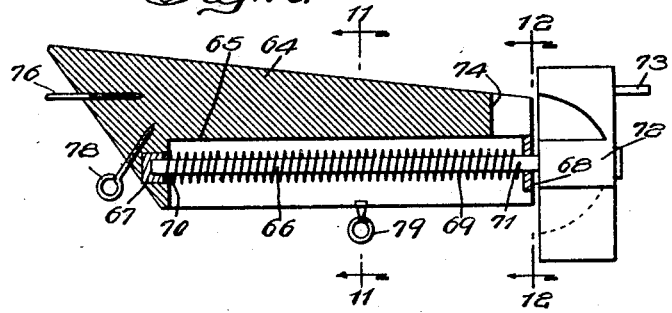
Fig. 10 is a longitudinal sectional elevation taken substantially as indicated by the line 10—10 of Fig. 9.
Figures 11, 12:
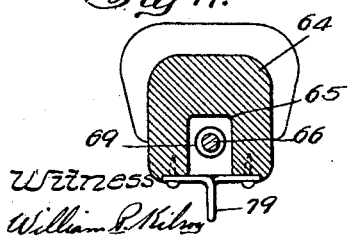
Fig. 11 is a transverse sectional elevation taken as indicated by the line 11—11 of Fig. 10.
Fig. 12 is a transverse sectional elevation taken as indicated by the line 12—12 of Fig. 10.

The operation of the lure shown in Figs. 7 to 12, inclusive, is similar to that described in connection with the previously mentioned forms, it being apparent that after the spring 69 is wound, the slug 75 may be positioned in the recess 74 in a manner to extend into the path of rotation of the agitator 72 as illustrated in Figs. 8 and 9 to prevent rotation of the agitator during the casting operation, and after the lure and tablet 75 have been brought into contact with the water, the tablet, by reason of the action of the water thereon will, after a suitable length of time, become dissolved or sufficiently weakened or softened to release the agitator and permit it to rotate under the force of the energy stored in the spring 69.

It will be observed from the foregoing description that the present invention provides a structure wherein a movable part of the lure may be intermittently actuated, and wherein the operation of the actuating means and of the movable parts of the lure may be deferred or retarded during the casting operation and for a suitable period of time after the lure has come to rest on the surface of the water.

Furthermore, that the present invention provides suitable retaining means responsive to the action of water thereon for retarding the operation of the mechanism employed.

Obviously, the present invention is not limited to the precise construction and arrangement shown and described as the same may be variously modified. Moreover, all of the features of the invention need not be used conjointly as the same may be used to advantage in variously different combinations and sub-combinations.

Having thus described my invention, it is obvious that various immaterial modifications may be made in the same without departing from the spirit of my invention; hence, I do not wish to be understood as limiting myself to the exact form, construction, arrangement, and combination of parts herein shown and described or uses mentioned.

I claim:

1. An article of the class described comprising a body portion, an agitator mounted thereon, means for driving said agitator, and means for securing said driving means against operation and chemically responsive to the action of water thereon to permit the operation of said driving means.

2. An article of the class described comprising a body portion, a movable agitator mounted thereon, means for driving said agitator, and means operatively related to said driving means and cooperable with said body portion for securing the driving means against operation and chemically responsive to the action of water thereon to effect the release of said driving means.

3. An article of the class described comprising a body portion, an agitator movably mounted thereon, means for driving said agitator, and means cooperable with the agitator for securing said driving means against operation and chemically responsive to the action of water thereon to effect the release of said driving means.

4. An article of the class described comprising a body portion, an agitator movably mounted thereon, means for driving said agitator, and means cooperable with the agitator and said body portion for securing said agitator against movement and chemically responsive to the action of water thereon to effect the release of said agitator.

5. An article of the class described comprising a body portion, an agitator mounted thereon, a source of power mounted in said body portion, means for operatively connecting said source of power with said agitator, and means operatively related to said connecting means for securing the connecting means against operation and chemically responsive to the action of water thereon in a manner to release said connecting means for driving said agitator.

6. An article of the class described comprising a body portion, an agitator mounted thereon, and automatically actuated means including a mutilated gear carried by said body portion for intermittently driving said agitator.

7. An article of the class described comprising a body portion, an agitator thereon, automatically actuated means carried by said body portion for intermittently driving said agitator, and soluble means for temporarily securing said agitator against operation.

8. An article of the class described comprising a body portion, an agitator mounted thereon, automatically actuated means carried by said body portion for intermittently driving said agitator, and means for temporarily securing said agitator against operation, said last mentioned means comprising a key member formed of material adapted to be dissolved when brought in contact with water for effecting the release of said agitator.

9. An article of the class described comprising a body portion, an agitator mounted thereon, automatically actuated means for intermittently driving said agitator, and means for securing said driving means against operation and responsive to the action of water thereon for effecting the release of said driving means.

10. An article of the class described comprising a body portion, an agitator mounted thereon, a spring motor carried by said body portion, gearing operatively connected to said motor and agitator, said gearing including a mutilated gear for intermittently driving said agitator.

11. An article of the class described comprising a body portion, an agitator mounted thereon, a spring motor carried by said body portion, gearing operatively connected to said motor and agitator, said gearing including a mutilated gear for intermittently driving said agitator, and a key member of soluble material cooperable with the agitator and body portion for securing said agitator against operation.

12. An article of the class described comprising a body portion, an agitator rotatably mounted thereon, a spring motor carried by said body portion, means for energizing the spring thereof, reduction gearing operatively connected to said motor and agitator, said gearing including a mutilated gear for intermittently driving said agitator, and a key member of water soluble material cooperable with the agitator and body portion for temporarily securing said agitator against rotation and for effecting the release of the agitator when the key member is brought into contact with the water.

13. An article of the class described comprising a body portion having a recess formed therein, an agitator rotatably mounted on said body portion, a spring motor, manually actuated means for energizing said motor, means operatively connected to said motor for intermittently driving said agitator, and a key member of water soluble material adapted to be positioned in said recess in a manner to cooperate with said agitator for securing the agitator against rotation when out of the water and for effecting the release of the agitator when said key member is brought into contact with the water.

14. In an article of the class described comprising a body portion, an agitator mounted thereon, a spring motor carried by said body portion, means for energizing the spring thereof, reduction gearing operatively connected to said motor and agitator, said gearing including a mutilated gear for intermittently driving said agitator, a key member cooperable with the agitator and body portion for temporarily securing said agitator against movement and for effecting the release of the agitator when the key member is brought into contact with the water.

In witness whereof, I hereunto subscribe my name this 15th day of July, A. D. 1929.

JAMES J. SUNDAY.